(12) United States Patent
Buerglin et al.

(10) Patent No.: US 7,877,990 B2
(45) Date of Patent: Feb. 1, 2011

(54) METERING DEVICE AND INTERNAL COMBUSTION ENGINE HAVING A METERING DEVICE

(75) Inventors: Markus Buerglin, Ditzingen (DE); Dirk Heilig, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 808 days.

(21) Appl. No.: 11/576,186

(22) PCT Filed: Jul. 7, 2005

(86) PCT No.: PCT/EP2005/053247

§ 371 (c)(1),
(2), (4) Date: Mar. 28, 2007

(87) PCT Pub. No.: WO2006/084508

PCT Pub. Date: Aug. 17, 2006

(65) Prior Publication Data

US 2007/0266698 A1 Nov. 22, 2007

(30) Foreign Application Priority Data

Sep. 28, 2004 (DE) .................. 10 2004 046 879

(51) Int. Cl.
*F01N 3/00* (2006.01)
*F01N 3/10* (2006.01)
(52) U.S. Cl. .............................. 60/320; 60/274; 60/286; 60/295; 60/301; 60/303

(58) Field of Classification Search .................. 60/322, 60/286, 295
See application file for complete search history.

(56) References Cited

U.S. PATENT DOCUMENTS

| | | | |
|---|---|---|---|
| 5,605,042 A | 2/1997 | Stutzenberger | |
| 6,141,958 A * | 11/2000 | Voss | 60/272 |
| 6,513,323 B1 * | 2/2003 | Weigl et al. | 60/286 |
| 2003/0230646 A1 | 12/2003 | Edgar et al. | |

FOREIGN PATENT DOCUMENTS

| | | |
|---|---|---|
| DE | 101 40 988 A1 | 11/2002 |
| JP | 9-96212 | 4/1997 |
| WO | WO 03/084647 A1 | 10/2003 |

* cited by examiner

*Primary Examiner*—Thomas E Denion
*Assistant Examiner*—Michael Carton
(74) *Attorney, Agent, or Firm*—Ronald E. Greigg

(57) ABSTRACT

A metering device for introducing an operating medium into an exhaust manifold of an internal combustion engine, the device comprising a cooling system for cooling an injector module of the metering device. The cooling system is provided with a cooling circuit encompassing at least one cooling fluid and at least one cooling device which dissipates heat from the cooling circuit. A first portion of the cooling circuit is disposed at least in part below the cooling device and/or a second portion of the cooling circuit is located at least in part above a point that heats the cooling circuit, especially above the injector module.

19 Claims, 2 Drawing Sheets

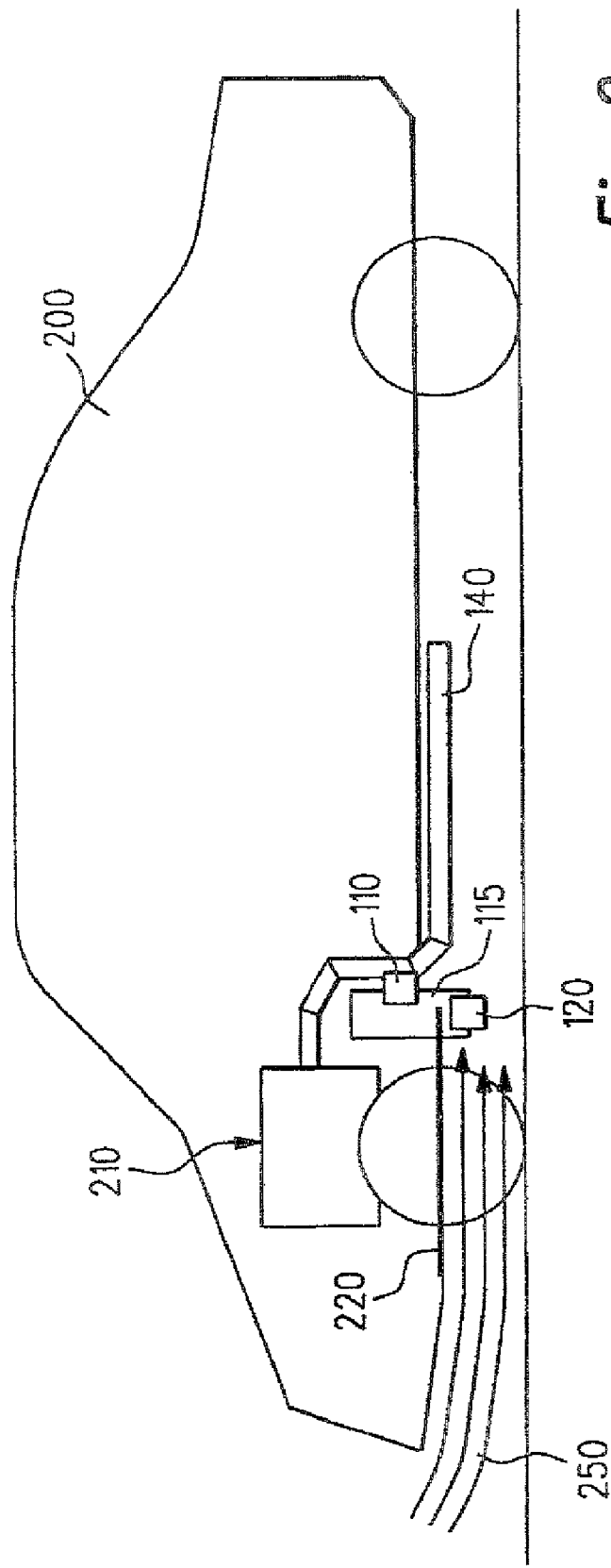

METERING DEVICE AND INTERNAL COMBUSTION ENGINE HAVING A METERING DEVICE

CROSS-REFERENCE TO RELATED APPLICATION

This application is a 35 USC 371 application of PCT/EP 2005/053247 filed on Jul. 7, 2005.

BACKGROUND OF THE INVENTION

1. Field of the Invention

The present invention relates to a metering device for introducing an operating medium, in particular into an exhaust manifold of an internal combustion engine, having a cooling system for cooling an injector module, in particular, of the metering device, in which the cooling system has a cooling circuit with a cooling fluid, and having at least one cooling device that carries heat out of the cooling circuit.

The present invention further relates to an internal combustion engine having such a metering device.

2. Description of the Prior Art

Known metering devices are used for instance to introduce operating medium, such as an aqueous urea solution used as a reducing agent precursor, into an exhaust manifold of an internal combustion engine. After being introduced into the exhaust gas, the urea solution reacts to form ammonia. The ammonia, in turn, reacts selectively at a so-called SCR (selective catalytic reduction) catalytic converter with nitrogen oxides contained in the exhaust gas of the engine to form molecular nitrogen and water, making denitrification, especially of diesel engine exhaust gases, possible.

To assure safe function of an injector module of the metering device, the injector module being exposed to the hot exhaust gases of the engine, reliable cooling of the injector module is necessary. Typically, the operating medium, such as the aqueous urea solution, also requires cooling in order not to decompose and be made unusable under the influence of the high temperatures from the exhaust manifold.

For this purpose, in the prior art cooling by the operating medium itself, that is, the urea solution, for instance, is proposed. Given a relatively high freezing point of the operating medium, which in the case of the aqueous urea solution is approximately −11° C., such cooling especially in winter cannot be employed, since the operating medium can freeze, and in that condition cooling of the injector module is not possible.

In order nevertheless to enable reliable operation of the engine and rapid introduction of the operating medium even at below-freezing temperatures, the above-described conventional systems are provided with thermally insulated heated lines for the operating medium, which dictates increased production costs for the metering device. In operation of the engine in which the injector module is heated by hot exhaust gases, the thermal insulation of the lines also makes cooling the injector module more difficult.

It is accordingly the object of the present invention to provide an improved metering device and an internal combustion engine having an improved metering device, in which in particular, simple and simultaneously reliable cooling, particularly of an injector module, is possible.

SUMMARY AND ADVANTAGES OF THE INVENTION

In the above-described metering device, this object is attained according to the invention in that a first part of the cooling circuit is disposed at least partly below the cooling device; and/or that a second part of the cooling circuit is disposed at least partly above a point that heats the cooling circuit, in particular above the injector module.

By the disposition according to the invention of the cooling circuit, it is assured in the region of the cooling device that cooled cooling fluid from the cooling device, because of its greater density compared to non-cooled cooling fluid, drops downward because of gravity. Because of this convection flow, cooling fluid located above the cooling device and as yet uncooled is fed to the cooling device, so that it too will be cooled down there.

This kind of convection flow is also obtained by means of a disposition of a second part of the cooling circuit above a point that heats the cooling circuit. The cooling fluid heated at this point has a lesser density than the replenishing cooling fluid flowing to the heated point from below, for instance, and accordingly rises, whereupon cooler cooling fluid for replenishing it flows to the point that heats the cooling circuit.

By combining the above two dispositions in the first and second parts of the cooling circuit, a secure flow or circulation of the cooling fluid in the cooling circuit can be achieved, so that a recirculating pump to generate a permanent cooling fluid flow in the cooling circuit of the metering device of the invention is no longer required.

Depending on the dimensioning of the cooling circuit, it is also possible to attain a circulation of the cooling fluid with only one part, embodied according to the invention, of the cooling circuit.

In a highly advantageous embodiment of the metering device of the invention, the first part of the cooling circuit communicates directly with the cooling device. The result is especially good convection in the region of the first part of the cooling circuit, and correspondingly good circulation of the cooling fluid in the cooling circuit.

A further highly advantageous embodiment of the metering device of the invention is characterized in that the second part of the cooling circuit communicates directly with the point that heats the cooling circuit, in particular directly with the injector module, as a result of which again the desired convection is advantageously established.

In a further embodiment of the present invention, the first part of the cooling circuit extends below the cooling device by at least a first difference in height, so that in this first part, a sufficiently large volume inside the cooling circuit is available, into which the cooled, descending cooling fluid can spread out.

In a further highly advantageous embodiment of the metering device of the invention, the second part of the cooling circuit extends above the point that heats the cooling circuit by at least a second difference in height. Once again, this assures that adequate convection can take place, directly at the point that heats the cooling circuit, by means of an unhindered ascension of heated cooling fluid.

In another highly advantageous variant of the invention, the cooling device has cooling fins on a pipeline containing the cooling circuit and/or has a plurality of pipelines and/or heat-conducting mesh, or the like.

Another highly advantageous embodiment of the metering device of the invention provides that the cooling device is disposed in a motor vehicle in such a way that a relative wind can flow at least partly around it. In this way, an adequate heat dissipation from the cooling device and thus from the entire cooling circuit is always assured.

In a further variant of the metering device of the invention, it is provided quite particularly advantageously that guide baffles are used, in order to carry relative wind to the cooling device and/or to shield the cooling device from air, particularly air heated by an internal combustion engine, so that even more effective cooling of the cooling fluid by the cooling device exists.

As a further means of attaining the object of the present invention, an internal combustion engine is disclosed.

BRIEF DESCRIPTION OF THE DRAWINGS

Further characteristics, possibilities of use, and advantages of the invention will become apparent from the ensuing description of exemplary embodiments of the invention, taken in conjunction with the drawings, in which:

FIG. 2 schematically shows one embodiment of the internal combustion engine of the invention.

DESCRIPTION OF THE PREFERRED EMBODIMENTS

Figure 1:
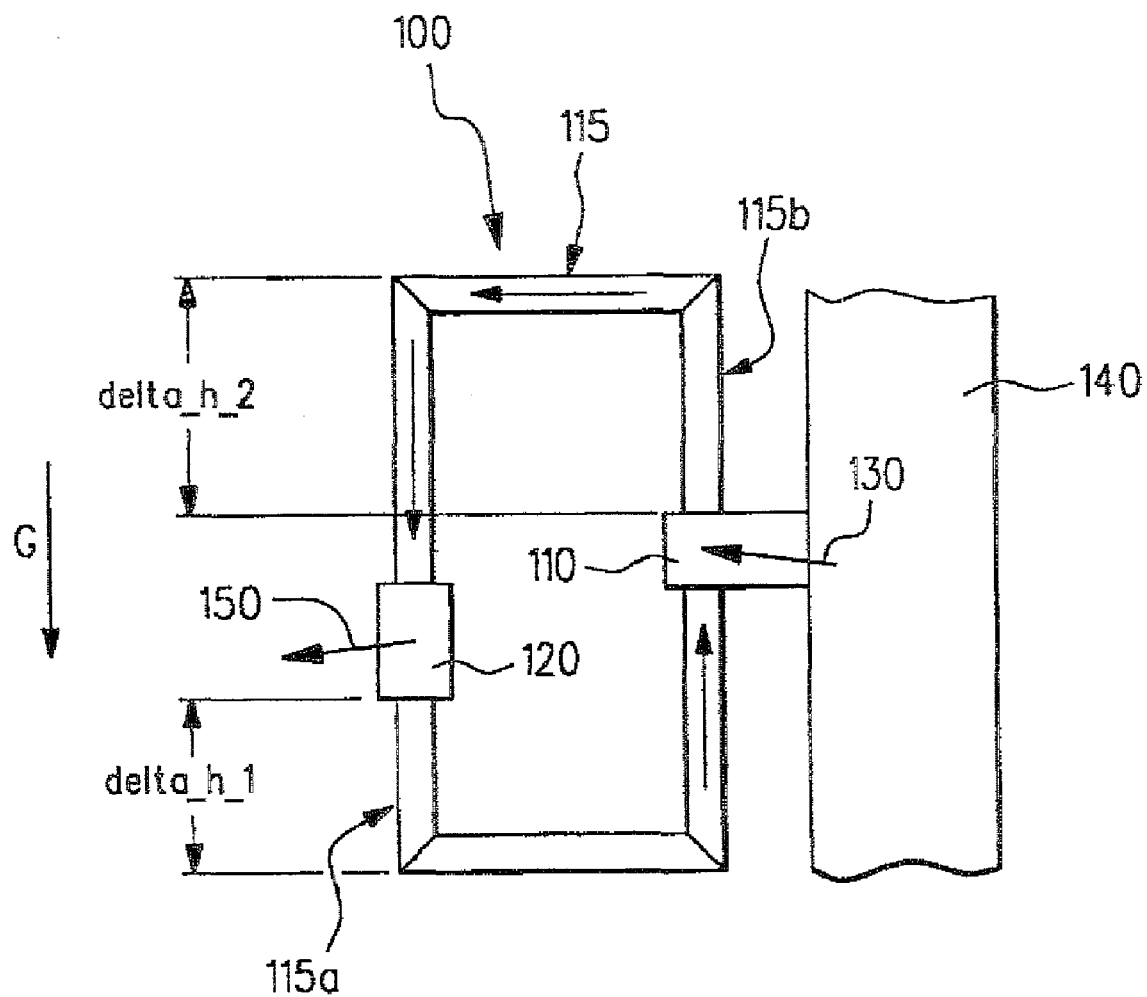
FIG. 1 schematically shows one embodiment of the metering device of the invention.

The metering device 100 shown in FIG. 1 has a cooling circuit 115, which is provided for carrying away heat that is supplied to the cooling circuit 115 from exhaust gas (not shown) flowing in an exhaust tube, or tract, 140. As symbolized by the arrow 130 in FIG. 1, an injector module 110 protruding into the exhaust tube 140 is heated here by the exhaust gas, and the injector module 110 in turn heats a cooling fluid provided in the cooling circuit 115. As a result, cooling of the injector module 110 by the cooling circuit 115 is simultaneously provided.

The injector module 110 is provided for introducing an operating medium, such as a reducing agent precursor, into the exhaust manifold, or tract, 140. The reducing agent precursor may for instance be an aqueous urea solution. A delivery of the operating medium to the injector module 110 is not shown in FIG. 1.

The cooling fluid, which is for instance a commercially available mixture of water and glycol, preferably has a lower freezing point than the operating medium, so that even in winter conditions, for instance, reliable circulation of the cooling fluid in the cooling circuit 115 is attained.

As a result, the disadvantage of conventional metering devices is avoided; they provide for cooling of the injector module 110 by the operating medium itself and because of the relatively high freezing point of the operating medium, which in the case of an aqueous urea solution is approximately −11° C., they no longer function in cold weather. In these conventional devices, although the operating medium, possibly frozen, that is located directly around the exhaust gas-heated injector module 110, is thawed, but its circulation in a cooling circuit and hence effective cooling of the injector module 110 in particular is not possible.

In the metering device 100 of the invention, this problem does not arise, because of the cooling fluid that has a low freezing point, so that reliable circulation of the cooling fluid and hence effective cooling are possible at all times.

As symbolized by the arrow 150 in FIG. 1, a cooling device 120 serves to dissipate heat from the cooling circuit 115 or the cooling fluid to the environment.

For this purpose, the cooling device 120 is advantageously equipped with cooling fins and the like, not shown in FIG. 1.

In an embodiment of the cooling device 120 as a pipeline, these cooling fins may be mounted directly on the surface of the pipeline. It is also possible to embody the cooling device 120 by means of a plurality of parallel-extending pipelines and/or heat-conducting mesh that connects them.

As shown in FIG. 1, a first part 115a of the cooling circuit 115 is disposed directly below the cooling device 120 and extends below the cooling device 120 by a first difference in height delta_h_1. In this way, it is possible for cooling fluid, cooled by the cooling device 120, to sink directly downward into the first part 115a of the cooling circuit 115 as a result of its higher density. The arrow marked G pointing downward in FIG. 1 symbolizes a direction of the force of gravity G that acts on the cooling fluid.

Because of the convection flow, downward in FIG. 1 inside the first part 115a of the cooling circuit 115, of the cooling fluid cooled by the cooling device 120, suction is created in the upper left region of the cooling circuit 115 for portions of the cooling fluid located above the cooling device 120, so that these portions flow toward the cooling device 120, where they are likewise cooled.

Because of this convection flow, according to the invention a circulation of the cooling fluid in the cooling circuit 115 ensues, so that effective cooling of the injector module 110 is assured. A recirculating pump or the like is therefore unnecessary in the metering device of the invention for the cooling system.

Furthermore, in the upper right region (FIG. 1) of the cooling circuit 115, a second part 115b is provided, which is disposed directly above the injector module 110 and has a second difference in height delta_h_2; the injector module 110 is heated by the exhaust gas flowing through the exhaust tube, or tract, 140 and thus heats the cooling fluid in the cooling circuit 115 as well.

Because of its lesser density, the cooling fluid heated in this way rises, counter to the force of gravity G as viewed from the injector module 110, and therefore brings about a replenishing flow of cooler cooling fluid from a region of the cooling circuit 115, located below the injector module 110, to the injector module 110.

Thus without using a recirculating pump, solely by convection, because of the disposition according to the invention of the first part 115a and the second part 115b of the cooling circuit 115, reliable cooling of the injector module 110, or other components (not shown) as well, is attained.

For safe operation of the cooling system, adequate dimensioning of the differences in height between delta_h_1 and delta_h_2 is necessary in such a way that the convection flow of the cooling fluid, occurring in the region of the first part 115a and the second part 115b, suffices to induce the cooling fluid, present in the other portions of the cooling circuit 115, to circulate.

In FIG. 2, an embodiment of the metering device of the invention is shown in a possible installed position on the exhaust tube, or tract, 140 of the internal combustion engine 210. As can be seen from FIG. 2, between the engine 210 and the cooling device 120, a guide baffle 220 is provided, which on the one hand conducts the relative wind, symbolized by the arrows 250 pointing from left to right, to the cooling device 120 and in this way contributes to the cooling of the cooling device. On the other hand, the guide baffle 220 shields the cooling device 120 against heated air (not shown) that is created for instance in the region of the engine 210 and could impair the functioning of the cooling device 120.

Thus in operation of the vehicle 200, or in other words in the state in which the injector module 110 is also heated by the exhaust gases from the engine 210, especially good cooling of the cooling device 120 by the relative wind 250 exists.

In this way, the above-described convection of the cooling fluid ensues and makes reliable cooling of the injector module 110 possible without a separate recirculating pump, for instance, of the kind needed in known cooling circuits.

A further advantage over a conventional cooling system, in which the operating medium itself is employed for cooling, is that in the cooling system of the metering device 100 (FIG. 1) according to the invention, there is no heat input into a container for the operating medium, since the cooling circuit 115 has a separate cooling fluid and is separate from an operating medium circuit (not shown). The return for operating medium flowing back from the cooling circuit into a container, as is required in conventional systems, is likewise unnecessary in the metering device 100 of the invention.

The foregoing relates to a preferred exemplary embodiment of the invention, it being understood that other variants and embodiments thereof are possible within the spirit and scope of the invention, the latter being defined by the appended claims.

The invention claimed is:

1. A metering device (100) having an injector module for introducing an operating medium into an exhaust tract (140) of an internal combustion engine (210), having a cooling system for cooling the injector module (110) of the metering device (100), with the cooling system having a cooling circuit (115) with a cooling fluid and with at least one cooling device (120) which dissipates heat from the cooling circuit (115), characterized in that a first part (115*a*) of the cooling circuit (115) is arranged at least partially below the cooling device (120) and a second part (115*b*) of the cooling circuit (115) is arranged at least partially above the injector module (110) which heats the cooling circuit, such that circulation of the cooling fluid in the cooling circuit (115) is generated solely by a convection flow of the cooling fluid, in such a way that the first part (115*a*) of the cooling circuit serves exclusively for conducting the cooling fluid to the heating point and the second part (115*b*) of the cooling circuit serves exclusively for conducting the cooling fluid to the cooling device (120).

2. The metering device as defined by claim 1, wherein the first part of the cooling circuit communicates directly with the cooling device.

3. The metering device as defined by claim 1, wherein the second part of the cooling circuit communicates directly with the injector module.

4. The metering device as defined by claim 2, wherein the second part of the cooling circuit communicates directly with the injector module.

5. The metering device as defined by claim 1, wherein the first part of the cooling circuit extends below the cooling device by at least one first difference in height.

6. The metering device as defined by claim 2, wherein the first part of the cooling circuit extends below the cooling device by at least one first difference in height.

7. The metering device as defined by claim 3, wherein the first part of the cooling circuit extends below the cooling device by at least one first difference in height.

8. A metering device for introducing an operating medium, in particular into an exhaust tract of an internal combustion engine, the device comprising a cooling injector module, and a cooling system for cooling the injector module, the cooling system having a cooling circuit for containing a cooling fluid and least one cooling device that carries heat out of the cooling circuit, a first part of the cooling circuit being disposed at least partly below the cooling device by at least a first difference in height and being connected to the cooling device so that as the cooling fluid is cooled by the cooling device it sinks into the first part of the cooling circuit; and a second part of the cooling circuit being disposed at least partly above the injector module, by at least a second difference in height and being connected to the injector module so that as the cooling fluid is heated by the injector module it rises into the second part of the cooling system, the differences in temperature of the cooling fluid in the first and second parts of the cooling system thus causing the cooling fluid to circulate through the cooling system.

9. The metering device as defined by claim 2, wherein the second part of the cooling circuit extends above the injector module by at least one second difference in height.

10. The metering device as defined by claim 3, wherein the second part of the cooling circuit extends above the injector module by at least one second difference in height.

11. The metering device as defined by claim 5, wherein the second part of the cooling circuit extends above the injector module by at least one second difference in height.

12. The metering device as defined by claim 1, wherein the cooling device further comprises means for dissipating heat from the cooling circuit.

13. The metering device as defined by claim 5, wherein the cooling device further comprises means for dissipating heat from the cooling circuit.

14. The metering device as defined by claim 8, wherein the cooling device further comprises means for dissipating heat from the cooling circuit.

15. The metering device as defined by claim 1, wherein the cooling device is disposed in a motor vehicle in such a way that a relative wind can flow at least partly around it.

16. The metering device as defined by claim 1, further comprising guide baffles which are disposed to conduct relative wind to the cooling device and/or to shield the cooling device against air heated by an internal combustion engine.

17. The metering device as defined by claim 12, further comprising guide baffles which are disposed to conduct relative wind to the cooling device and/or to shield the cooling device against air heated by an internal combustion engine.

18. The metering device as defined by claim 15, further comprising guide baffles which are disposed to conduct relative wind to the cooling device and/or to shield the cooling device against air heated by an internal combustion engine.

19. An internal combustion engine including a metering device for introducing an operating medium into an exhaust tract of the engine, the metering device having a cooling system for cooling an injector module of the metering device, and wherein the cooling system has a cooling circuit containing cooling fluid and with at least one cooling device that carries heat out of the cooling circuit, a first part of the cooling circuit being disposed at least partly below the cooling device by at least a first difference in height and being connected to the cooling device so that as the cooling fluid is cooled by the cooling device it sinks into the first part of the cooling circuit; and a second part of the cooling circuit being disposed at least partly above the injector module by at least a second difference in height and being connected to the injector module so that as the cooling fluid is heated by the injector module it rises into the second part of the cooling system, the differences in temperature of the cooling fluid in the first and second parts of the cooling system thus causing the cooling fluid to circulate through the cooling system.

* * * * *